United States Patent [19]

Theurer

[11] Patent Number: 5,090,329
[45] Date of Patent: Feb. 25, 1992

[54] REFERENCE SYSTEM FOR TRACK WORKING MACHINE

[75] Inventor: Josef Theurer, Vienna, Austria

[73] Assignee: Franz Plasser Bahnbaumaschinen Industriegesellschaft m.b.H., Vienna, Austria

[21] Appl. No.: 592,219

[22] Filed: Oct. 3, 1990

[30] Foreign Application Priority Data

Oct. 25, 1989 [AT] Austria ............... 2466/89

[51] Int. Cl.$^5$ ............................... E01B 33/00
[52] U.S. Cl. ............................... 104/7.1; 33/287
[58] Field of Search ............ 104/7.2, 7.1, 8, 12; 33/287

[56] References Cited

U.S. PATENT DOCUMENTS

| | | | |
|---|---|---|---|
| 3,334,593 | 8/1967 | Plasser et al. | 104/7.1 |
| 3,371,619 | 3/1968 | Stewart | 104/7.2 X |
| 3,459,136 | 8/1969 | St. John | 104/7.1 |
| 3,687,081 | 8/1972 | Plasser et al. | 104/7.2 X |
| 3,690,262 | 9/1972 | Plasser et al. | 104/7.2 |
| 3,706,284 | 12/1972 | Plasser et al. | 104/7.2 |
| 3,821,932 | 7/1974 | Theurer et al. | 104/7.2 |
| 4,165,693 | 8/1979 | Theurer | 104/7.2 |
| 4,165,694 | 8/1979 | Theurer | 104/7.2 |
| 4,341,160 | 7/1982 | Nielsen | 104/7.2 |
| 4,356,771 | 11/1982 | Theurer | 104/7.2 |
| 4,538,061 | 8/1985 | Jaquet | 104/7.2 X |

FOREIGN PATENT DOCUMENTS 476162 9/1969 Switzerland.

Primary Examiner—Johnny D. Cherry
Assistant Examiner—Joseph D. Pape
Attorney, Agent, or Firm—Collard, Roe & Galgano

[57] ABSTRACT

A reference system for a track working machine comprising a vertically and/or laterally adjustable working tool unit, comprises a front carriage spaced from a front end of the machine and being movable independently thereof, and a wireless remote control mounted on the machine and controlling the independent movement of the front carriage. A television camera and an emitter of a reference guide beam is pivotally mounted on the front carriage, and drives for pivoting the television camera and the reference guide beam emitter are controlled by the wireless remote control. A reference is mounted on the machine and controls and vertical and/or lateral adjustment of the working tool unit, a reference guide beam receiver is associated with the reference and is arranged on the machine for receiving the reference guide beam from the emitter, and a monitor is mounted on the machine and is in communication with the television camera.

4 Claims, 1 Drawing Sheet

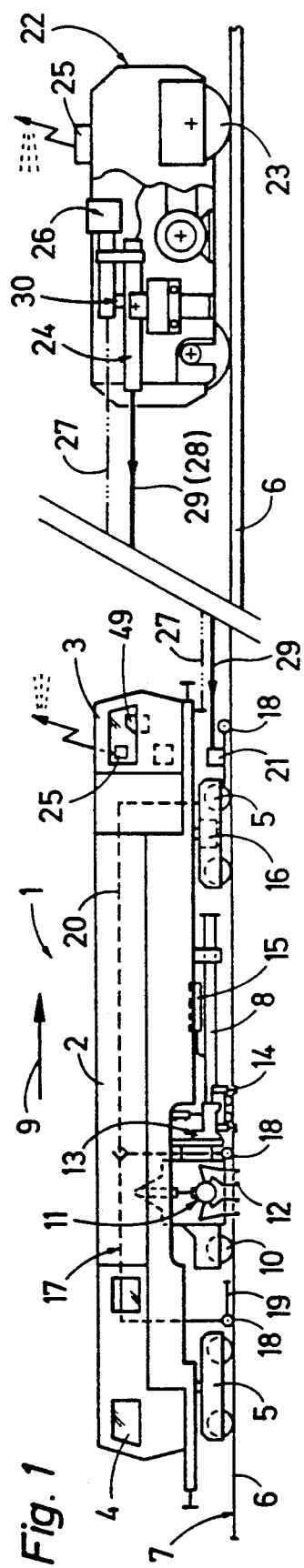
Fig. 1
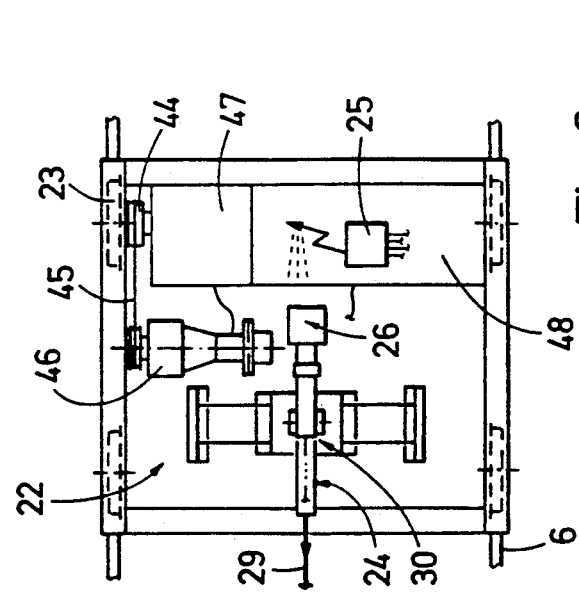
Fig. 3
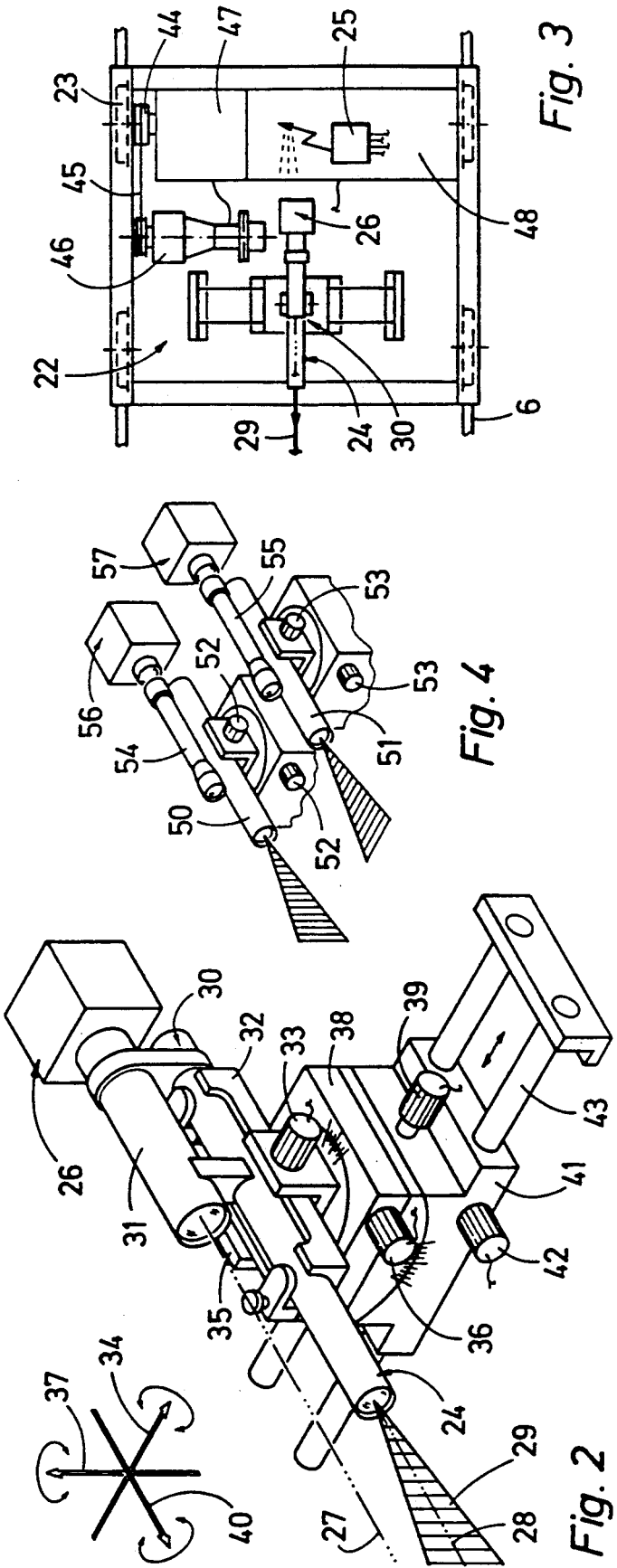
Fig. 4
Fig. 2

REFERENCE SYSTEM FOR TRACK WORKING MACHINE

BACKGROUND OF THE INVENTION

1. Field of the Invention

The present invention relates to a reference system for a track working machine comprising a vertically and/or laterally adjustable working tool unit, which comprises a front carriage spaced from a front end of the machine and being movable independently thereof, wireless remote control means mounted on the machine and controlling the independent movement of the front carriage, an emitter of a reference guide beam mounted on the front carriage for emitting the reference guide beam towards the machine, a reference means mounted on the machine and controlling the vertical and/or lateral adjustment of the working tool unit, and a reference guide beam receiver associated with the reference means and arranged on the machine for receiving the reference guide beam from the emitter.

2. Description of the Prior Art

A reference system of this general type has been disclosed in U.S. Pat. No. 3,706,284, dated Dec. 19, 1972. As described in this patent, a track tamper carries a reference means comprising tensioned reference wires extending between the front and rear undercarriages supporting the tamper for movement along a track, and a reference guide laser beam extends laterally of the reference means and serves as reference basis therefor. The laser beam is emitted from a laser beam emitter mounted on the rearmost undercarriage of the machine, and this emitter is remote-controllably positionable for sighting a laser beam receiver. This target receiver is arranged in the front portion of the machine and is transversely displaceable by a spindle drive to provide a fixed target. The machine operator can effectuate the focussing by means of a television receiver and a reproducing instrument. In one embodiment, a front carriage precedes the machine in the operating direction, the front carriage being equipped with a laser beam emitter and a telescope serving to focus the reference guide beam emitted from the emitter on the receiver mounted on the machine. A drive on the front carriage is remote-controllable by radio. This known reference system has the disadvantage of making it necessary for the tamper operator to walk to the front carriage in order to focus the emitter on the receiver.

SUMMARY OF THE INVENTION

It is the primary object of this invention to provide a reference system of the first-described type in which the focussing of the beam emitter on the front carriage with respect to the receiver on the machine is simplified and expedited.

The above and other objects are accomplished according to the invention with a reference system for a track working machine, particularly a track tamper, comprising a vertically and/or laterally adjustable working tool unit, which comprises a front carriage spaced from a front end of the machine and being movable independently thereof, wireless remote control means mounted on the machine and controlling the independent movement of the front carriage, and a television camera and an emitter of a reference guide beam pivotally mounted on the front carriage. Drive means for pivoting the television camera and the reference guide beam emitter is controlled by the wireless remote control means, and a reference means is mounted on the machine and controls the vertical and/or lateral adjustment of the working tool unit. A reference guide beam receiver is associated with the reference means and is arranged on the machine for receiving the reference guide beam from the emitter, and a monitor is mounted on the machine and is in communication with the television camera.

The arrangement of a remote-controlled television camera on the front carriage makes it possible rapidly and precisely to focus on the reference guide beam receiver arranged at the front of the machine without the necessity of an operator walking to the front carriage and making manual adjustments, with the concomitant loss of time in the operation of the machine. This substantially reduces the time required for repositioning the front carriage and then refocussing the emitter each time the track working machine has completed a predetermined cycle of operations, thus cutting the resultant interruption in the operations to a minimum. The operator in the track tamper cab can move the front carriage a desired distance, such as about 400 m, forward by remote control after the last possible operation in the cycle, such as tamping, has been completed and he can then immediately adjust the position of the emitter by observing the receiver on the machine and using focussing means on the monitor. In this connection, it is of particular advantage that the adjustments of the emitter are made by the operator seated in the cab so that the operator is safe and not exposed to the hazards of train traffic along an adjacent track. In addition, the operator who had to walk the longest distance of the front carriage from the machine in both directions, i.e. twice, can now use the time required for this for other work connected with the actual operations of the machine, i.e. tamping.

According to one preferred feature of the present invention, the reference guide beam is a laser beam, and the television camera and emitter have optical axes extending parallel to each other. This makes it possible for the remote-controlled focussing to be effectuated rapidly without regard to the distance between the machine and the front carriage.

According to another preferred embodiment, the television camera and the emitter form a structural unit. With such a unit, the pivoting of the emitter for focussing the emitted beam on the receiver will automatically and likewise pivot the television camera in a position wherein it will accurately observe the receiver and the focussing devices on the monitor.

Preferably, the drive means comprises three drives independently controlled by the wireless remote control means for respectively pivoting the structural unit about three axes extending substantially perpendicularly to each other. Such universal pivoting capability of the structural unit enables the emitter to be exactly adjusted with respect to the receiver by remote control, regardless of any position error of the track section supporting the front carriage.

In accordance with yet another embodiment of this invention, the reference system further comprises a transversely displaceable carrier whereon the structural unit and the drives are mounted, transverse guide means mounting the carrier on the front carriage, and a remote-controllable drive for transversely displacing the carrier. This arrangement enables the entire structural unit encompassing the television camera, the reference guide beam emitter and their drives to be accurately positioned by remote control in a desired transverse position.

Preferably, the reference system further comprises a telescopic sight attached to the emitter and projecting towards the receiver, the television camera being arranged forwardly of the telescopic sight with respect to the machine. This makes it possible to retrofit conventional laser beam emitters with telescopic sights in the reference system of the invention and also enables the emitter with the telescopic sight to be focussed manually if the monitor or the television camera should be temporarily out of order.

Finally, the present invention also comprises an embodiment comprising two television cameras and emitters, a respective one of the cameras and emitters being associated with each other and the drive means being arranged for independently pivoting the associated television camera and the reference guide beam emitter. This twin arrangement makes it possible to adjust the front end point of the leveling reference means and the lining reference means separately.

BRIEF DESCRIPTION OF THE DRAWING

The above and other objects, advantages and features of this invention will become more apparent from the following detailed description of certain now preferred embodiments thereof, taken in conjunction with the partially schematic drawing wherein FIG. 1 is a side elevational view of a conventional track leveling, lining and tamping machine carrying its own reference means for controlling leveling and/or lining of the track, and an enlarged view of a front carriage spaced from a front end of the machine and equipped with a laser beam emitter and a remote-controllable television camera, FIG. 2 is a perspective view of a structural unit comprising the emitter and television camera, FIG. 3 is a top view of the front carriage of FIG. 1, and FIG. 4 is a fragmentary view similar to that of FIG. 2 but showing another embodiment incorporating twin beam emitters and television cameras.

DETAILED DESCRIPTION OF PREFERRED EMBODIMENTS

The track working machine illustrated in FIG. 1 is a track leveling, lining and tamping machine 1 which advances continuously along track 7 in an operating direction indicated by arrow 9 while the track is level, lined and tamped. The machine comprises elongated machine frame 2 whose opposite ends are supported on the track by swivel trucks 5, 5 and carry operating cabs 3, 4. Track 7 consists of two rails 6 fastened to ties. Carrier frame 8 for the operating tools of the machine is arranged between swivel trucks 5, 5 and a forward end of the carrier frame, as seen in the operating direction, is longitudinally displaceably supported on machine frame 2 while the rear end of the carrier frame is supported on track rails 6 by support and steering carriage 10. The support and steering carriage has its own drive so that carrier frame 8 is self-propelled. Longitudinal displacement drive 15 links carrier frame 8 to machine frame 2 for intermittent movement of the machine frame between swivel trucks 5, 5 while machine frame 2 advances continuously in the operating direction by means of drive 16. The operating tools are mounted on carrier frame 8 ahead of support and steering carriage 10 in the operating direction and comprise vertically adjustable twin ballast tamping unit 11 including pairs of reciprocable and vibratory tamping tools 12, and vertically and transversely adjustable track leveling and lining unit 13 preceding the ballast tamping unit and including rail gripping lifting rollers 14 as well as flanged wheels running on the track rails.

The reference system for track working machine 1 comprises reference means 17 mounted on track working machine 1 for surveying the difference between the actual position of the track and the desired position thereof, and for controlling the vertical and/or lateral adjustment of working tool unit 13. Generally conventional reference means 17 comprises lining and leveling reference wires 19, 20 mounted on measuring axles 18 running on track rails 6. The reference system of the present invention further comprises front carriage 22 spaced from a front end of machine 1 and being movable independently thereof, flanged wheels 23 supporting the front carriage on the track. Wireless remote control means 25 has a control signal emitter mounted on machine 1 in front cab 3 and a control signal receiver mounted on front carriage 22 for controlling the independent movement of the front carriage. Television camera 26 and emitter 24 of reference guide beam 29 are pivotally mounted on the front carriage, and the reference system further comprises drive means 36, 39, 42 for pivoting the television camera and the reference guide beam emitter, the drive means being controlled by wireless remote control means 25. Reference guide beam receiver 21 is associated with reference means 17 and is arranged on machine 1 adjacent front measuring axle 18 of the reference means for receiving reference guide beam 29 from emitter 24, and monitor 49 is mounted on the machine in front cab 3 and is in communication with the television camera. In the illustrated embodiment, reference guide beam 29 is a laser beam projected by the optical system of the emitter as a fan-shaped planar beam extending perpendicularly to the track plane. Television camera 26 and emitter 24 have optical axes 27, 28 extending parallel to each other. As best shown in FIGS. 2 and 3, the television camera and the emitter are mounted on carrier 32 to form structural unit 30. Carrier 32 is mounted on support 35 arranged for pivoting about axis 34 extending perpendicularly to the longitudinal extension of machine 1 as well as axis 37 extending perpendicularly to axis 34 and the track plane. Furthermore, turntable 38 forming a goniometer mounts support 35 for pivoting about axis 40 extending perpendicularly to axes 34, 37 and parallel to optical axes 27, 28. Thus, as illustrated, the drive means for structural unit 30 comprises three drives 33, 36, 39 independently controlled by wireless remote control means 25 for respectively pivoting the structural unit about three axes 34, 37, 40 extending substantially perpendicularly to each other. Transversely displaceable carrier 41 supports structural unit 30 and its drives and transverse guide means 43 mounts carrier 41 on front carriage 22, and remote-controllable drive 42 is arranged for transversely displacing the carrier. Drives 33, 36, 39 and 42 are remote-controlled by wireless remote control means 25.

As shown in FIG. 3, V-belt transmission 45 transmits power from electro-motor 46 to axle 44 of front carriage wheel 23 to propel the front carriage, the electro-motor also being remote-controlled by means 25. Battery 47 supplies current to the electro-motor and this battery is charged while machine 1 is moved between operating sites. An additional battery 48 supplies energy to laser beam emitter 24 and the receiver of remote control means 25.

In the illustrated embodiment, the reference system further comprises a telescopic sight attached to emitter 24 and projecting towards receiver 21, the television camera having its objective lens system 31 arranged forwardly of the telescopic sight with respect to machine 1.

FIG. 4 illustrates another embodiment of the reference system of this invention. In this embodiment, the reference system comprises two television cameras 56, 57 and laser guide beam emitters 50, 51, a respective one of the cameras and emitters being associated with each other and remote-controlled drive means 52, 53 being arranged for independently pivoting the associated television camera and the reference guide beam emitter about three mutually perpendicular axes, as described in connection with FIG. 2. Each laser beam emitter is connected to respective telescopic sight 54, 55 associated with respective television camera 56, 57. In this embodiment, a vertically extending fan-shaped, planar laser beam is emitted from emitter 50 and is adjustable to focus accurately on the receiver of the lining reference means on track leveling, lining and tamping machine 1 while a horizontally extending fan-shaped, planar laser beam is emitted by emitter 51 to focus accurately on another receiver on machine 1, which is associated with the leveling reference means thereon.

The above-described apparatus operates in the following manner:

At the beginning of a track leveling, lining and tamping operation, the operator in front cab 3 of track leveling, lining and tamping machine 1 actuates wireless remote control means 25 to energize electro-motor 46 and thus to propel front carriage 22 in the operating direction indicated by arrow 9. When the front carriage is spaced about 400 m in front of machine 1, the wireless remote control means is used to brake the front carriage, whereupon transversely displaceable flanged wheels 23 of the front carriage are transversely displaced, again by remote control, until the flanges of the wheels are pressed against the gage side of the heads of track rails 6. Laser beam emitter 24 is then so focussed on receiver 21 by remote controlled operation of drives 33, 36, 39 and 42 that vertically extending fan-shaped, planar laser beam 29 is accurately aligned with receiver 21. This focussing procedure can be closely observed by television camera 26 and monitor 49 in cab 3, the initial focussing being faciliated, if desired, by sighting devices or view finders on machine 1. The guide beam accurately focussed on receiver 21 automatically controls the position of the front end point constituted by front measuring axle 18 of reference means 17 on machine 1 in the vertical plane defined by beam 29 during the continuous forward movement of machine 1.

This accurate control for the lining of the track is particularly useful for surfacing track designed for modern-day super-speed tracks which require high-precision positioning. It may obviously also be used for levelling control with a horizontally extending guide beam, as also described in connection with FIG. 4.

As soon as track leveling, lining and tamping machine 1, with cyclical tamping of the successively lined and-/or leveled ties, has reached stationary front carriage 22, wire remote control means 25 is operated to disengage flanged wheels 23 from the rails by displacing them inwardly and to energize electro-motor 46 to move front carriage 22 forward again to be spaced from machine 1. The above-described operation is then repeated.

What is claimed is:

1. A reference system for a track working machine comprising a vertically and/or laterally adjustable working tool unit, which comprises
   (a) a front carriage spaced from a front end of the machine and being movable independently thereof,
   (b) wireless remote control means mounted on the machine and controlling the independent movement of the front carriage,
   (c) a television camera and an emitter of a reference guide beam pivotally mounted on the front carriage, the television camera and the emitter forming a structural unit and having optical axes extending parallel to each other,
   (d) drive means for pivoting the structural unit, the drive means comprising three drives independently controlled by the wireless remote control means for respectively pivoting the structural unit about three axes extending substantially perpendicularly to each other,
   (e) a reference means mounted on the machine and controlling the vertical and/or lateral adjustment of the working tool unit,
   (f) a reference guide beam receiver associated with the reference means and arranged on the machine for receiving the reference guide beam from the emitter, and
   (g) a monitor mounted on the machine and in communication with the television camera.

2. The reference system of claim 1, wherein the reference guide beam is a laser beam.

3. The reference system of claim 1, further comprising a transversely displaceable carrier whereon the structural unit and the drives are mounted, transverse guide means mounting the carrier on the front carriage, and a remote-controllable drive for transversely displacing the carrier.

4. The reference system of claim 1, comprising two of said units, a respective one of the drive means being arranged for independently pivoting.

* * * * *